US012809316B2

(12) United States Patent
Christan et al.

(10) Patent No.: US 12,809,316 B2
(45) Date of Patent: Nov. 24, 2026

(54) HOROLOGICAL STOPPING MECHANISM

(71) Applicant: ETA SA MANUFACTURE HORLOGERE SUISSE, Grenchen (CH)

(72) Inventors: Julien Christan, Bienne (CH); Mark Postmus, Pieterlen (CH)

(73) Assignee: ETA SA MANUFACTURE HORLOGÈRE SUISSE, Grenchen (CH)

( * ) Notice: Subject to any disclaimer, the term of this patent is extended or adjusted under 35 U.S.C. 154(b) by 764 days.

(21) Appl. No.: 17/889,746

(22) Filed: Aug. 17, 2022

(65) Prior Publication Data

US 2023/0107367 A1 Apr. 6, 2023

(30) Foreign Application Priority Data

Oct. 5, 2021 (EP) .................................... 21200868

(51) Int. Cl.
*G04B 27/00* (2006.01)
*G04B 19/02* (2006.01)

(52) U.S. Cl.
CPC ............ *G04B 27/00* (2013.01); *G04B 19/02* (2013.01)

(58) Field of Classification Search
CPC ........ G04B 19/02; G04B 27/00; G04B 21/10; G04B 17/28
See application file for complete search history.

(56) References Cited

U.S. PATENT DOCUMENTS

2012/0207001 A1* 8/2012 Pittet ...................... G05D 13/24 368/243
2012/0243385 A1* 9/2012 Goeller .................. G04B 21/10 368/71
2023/0098943 A1* 3/2023 Christan ............. G04B 13/021 368/322

(Continued)

FOREIGN PATENT DOCUMENTS

CH 470 873 A 4/1969
CH 706 108 A2 8/2013
CN 218037696 U 12/2022

(Continued)

OTHER PUBLICATIONS

Japanese Office Action dated Sep. 26, 2023 in Japanese Application No. 2022-127836.
European Search Report for EP 21 20 0868, dated Feb. 24, 2022.

*Primary Examiner* — Edwin A. Leon
*Assistant Examiner* — Jason M Collins
(74) *Attorney, Agent, or Firm* — Sughrue Mion, PLLC

(57) ABSTRACT

A horological mechanism (100) including a controller (300) for controlling the stopping or release of a wheel (200), and a stopping lever (10) guided on a structure (400) and which includes a first arm (16) carrying a control finger (12) that can be set by the controller, and a second arm (17) carrying a stopping finger (13) arranged to bear against the wheel (200) or to release it, and a flexible arm (15), more flexible than the first arm (16) and arranged to bear against a first fixed banking (42) of the structure (400), and which allows the movement of the stopping lever (10) in a single configuration for driving the control finger (12) by the controller pushing the control finger (12), to move the second arm (17) and stop the movement of the wheel (200).

18 Claims, 5 Drawing Sheets

(56) References Cited

U.S. PATENT DOCUMENTS

2023/0408982 A1* 12/2023 Rochat .................. G04F 7/0842

FOREIGN PATENT DOCUMENTS

| | | | |
|---|---|---|---|
| EP | 3 792 701 | A1 | 3/2021 |
| JP | 47-36077 | U | 12/1972 |
| JP | 57-59389 | U | 4/1982 |
| JP | 61-178490 | U | 11/1986 |

* cited by examiner

HOROLOGICAL STOPPING MECHANISM

CROSS REFERENCE TO RELATED APPLICATIONS

This application claims priority to European Patent Application No. 21200868.4 filed Oct. 5, 2021, the entire contents of which are incorporated herein by reference.

TECHNICAL FIELD OF THE INVENTION

The invention relates to a horological mechanism including, fastened to a structure, control means arranged to be set by a user or by a mechanism or by a circuit of a timepiece and to control the stopping or release of a wheel, included in said mechanism, which includes at least one stopping lever guided on said structure at a guidance, said stopping lever including a first arm carrying, at a distance from said guidance, a control finger arranged to be set by said control means, and a second arm carrying, at a distance from said guidance, a stopping finger arranged to bear on said wheel or to release it.

The invention further relates to a timepiece, particularly a watch, including at least one such horological mechanism.

The invention relates to the field of horological control mechanisms.

TECHNOLOGICAL BACKGROUND

Different horological functions require the use of stopping means, in particular of stopping levers also known as stop levers, to stop the travel of a particular wheel. Such stopping means can prove to be very bulky due to the distance between the control organ and the wheel to be stopped. Moreover, the operation thereof can be complexified by the number of positions that the control organ can occupy.

SUMMARY OF THE INVENTION

The invention proposes to develop a simple and non-bulky stopping mechanism, including a stopping lever movable between only two positions, idle and active.

To this end, the invention relates to a horological mechanism according to claim 1.

The invention further relates to a timepiece, particularly a watch, including at least one such horological mechanism.

BRIEF DESCRIPTION OF THE FIGURES

The aims, advantages and features of the invention will be better understood on reading the following detailed description, with reference to the figures:

in FIG. 9, the control finger is close to the second travel-limiting surface but not in contact therewith; in FIG. 10, the control finger is close to the first support surface but not in contact therewith;

DETAILED DESCRIPTION OF THE INVENTION

Figure 1:
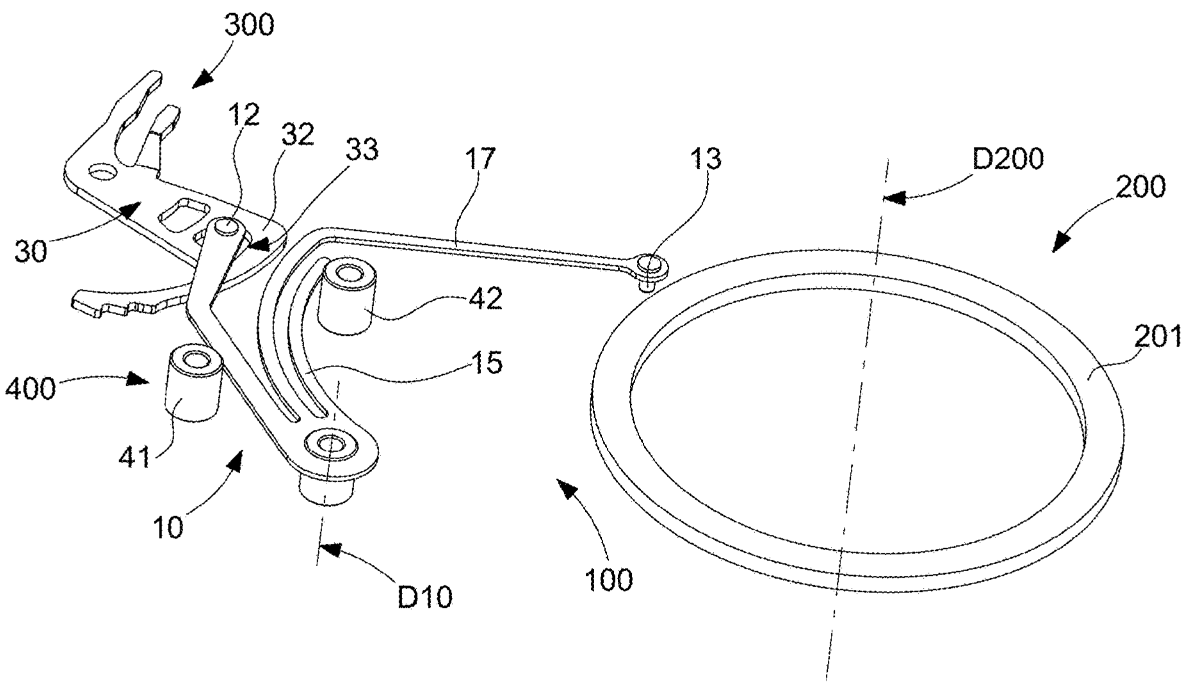
FIG. 1 represents a schematic, partial and perspective top view of a mechanism according to the invention, with in the left section a pull-out piece belonging to control means, which cooperates, herein in an idle position, with a pivoting stopping lever, the opposite end whereof includes a stopping finger which is here at a distance from the felloe of a wheel to be stopped, here a balance; the stopping lever includes three arms, two thereof respectively carry a control finger arranged to cooperate with the pull-out piece in certain relative positions, and this stopping finger; the third arm is a flexible arm, specific to the invention, bearing on a first fixed banking.
Figure 2:
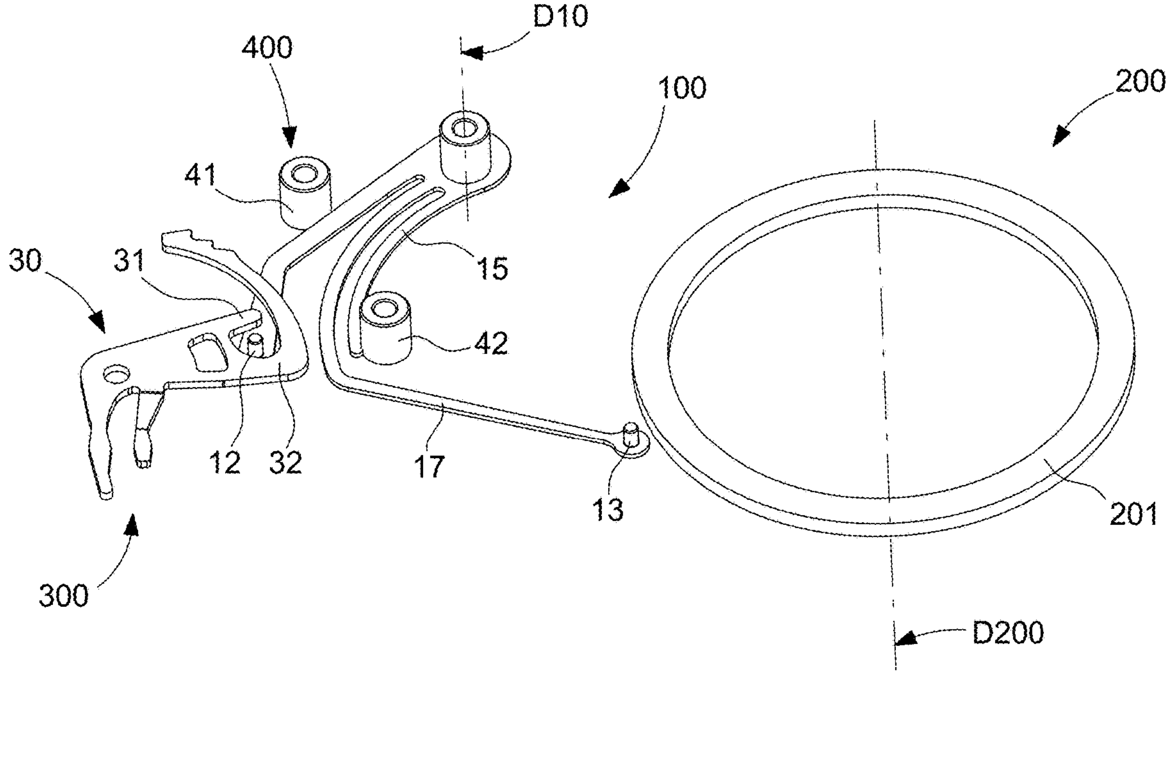
FIG. 2 represents the same mechanism, in the same position, in a perspective bottom view; it is seen that the pull-out piece includes an opening wherein the control finger of the stopping lever is mobile, the travel whereof is limited, in this specific non-limiting embodiment, on one hand by a rectilinear finger forming a first support surface, and on the other by a first and a second fixed banking; this control finger of the stopping lever is mobile in a hollow delimited by a curved surface forming a second travel-limiting surface beyond the first surfaces, and not used in normal operation; naturally the opening and the finger can be inverted, without deviating from the invention.
Figure 3:
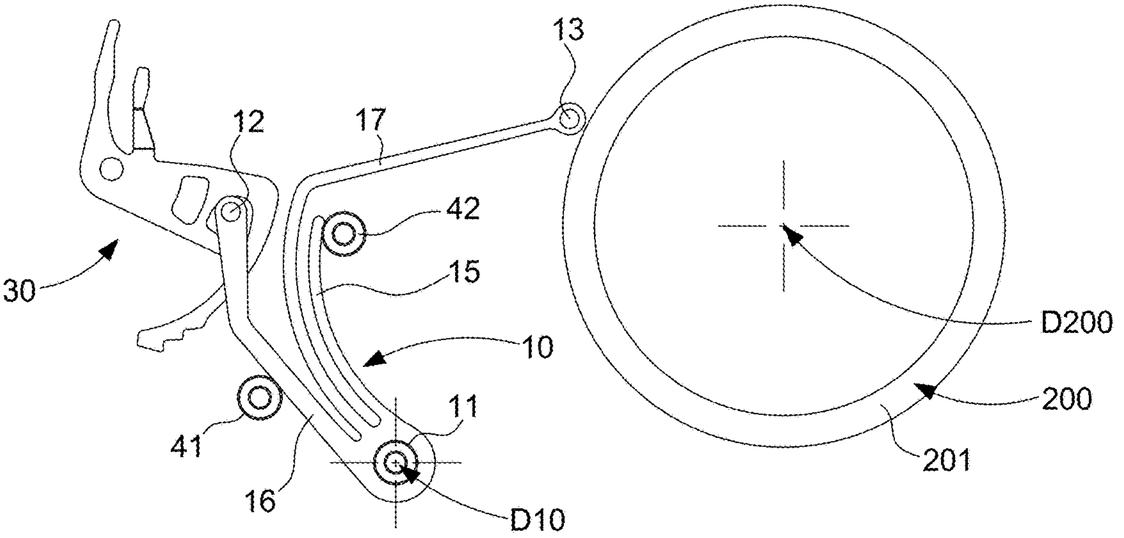
FIG. 3 represents the same mechanism, in the same position, in a top view.
Figure 4:
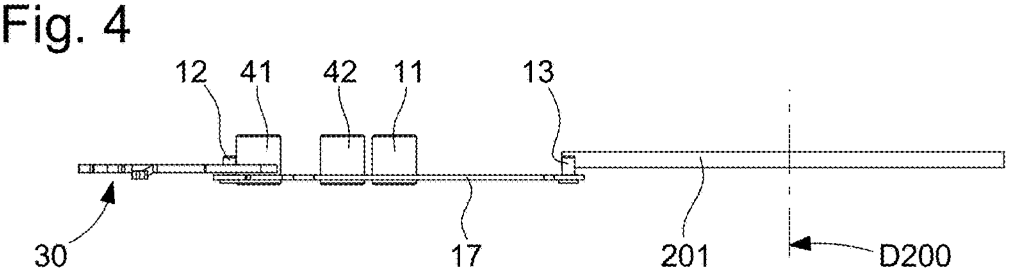
FIG. 4 represents the same mechanism, in the same position, in a side view from the side of the pull-out piece and the stopping finger in FIG. 3.
Figure 5:
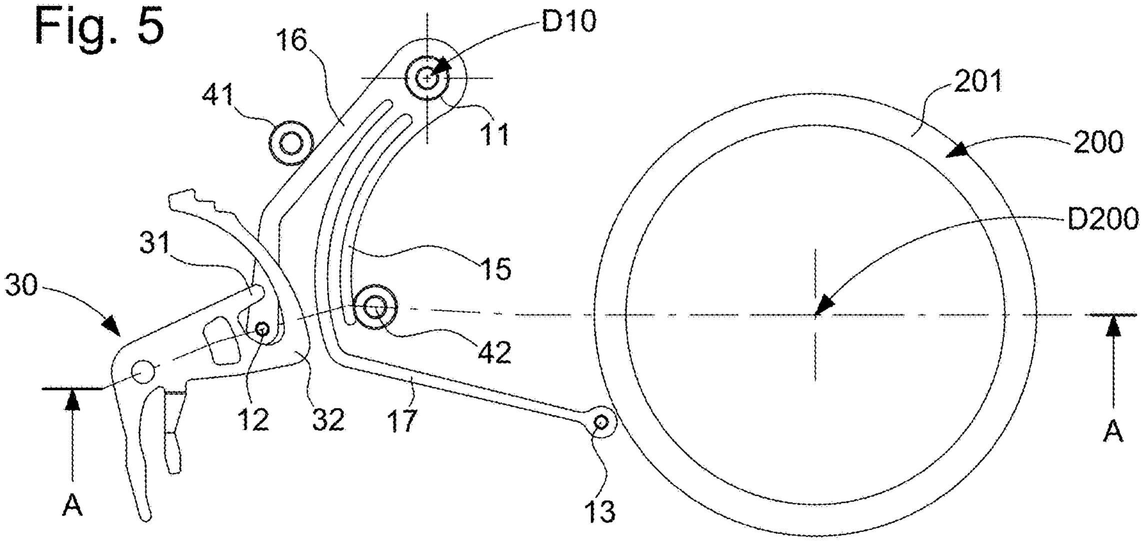
FIG. 5 represents the same mechanism, in the same position, in a bottom view.
Figure 6:
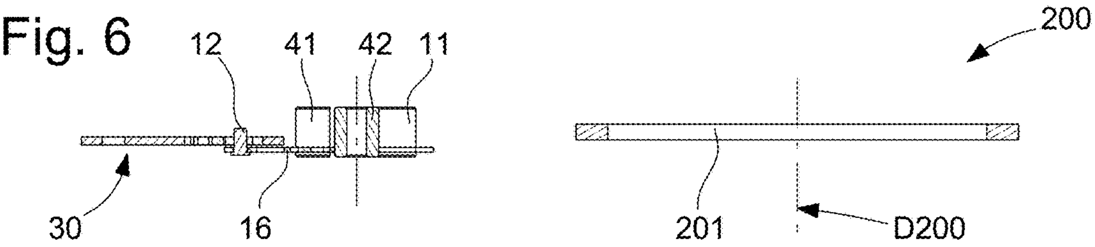
FIG. 6 represents the same mechanism, in a cross-section along the sectional line A-A in FIG. 5.
Figure 7:
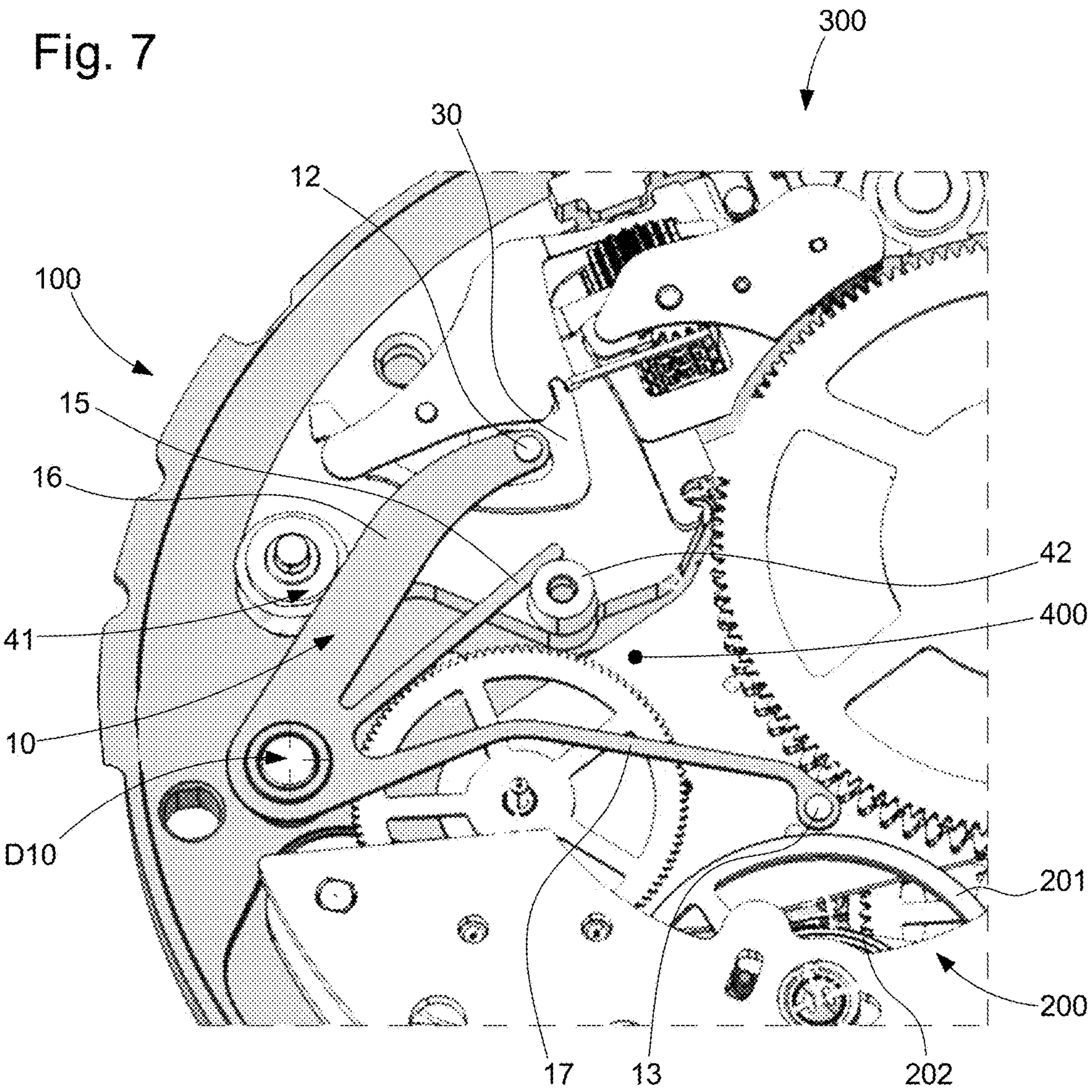
FIG. 7 represents a schematic, partial and perspective top view of another alterative embodiment of a mechanism according to the invention, where the flexible arm is between the two other arms of the stopping lever.
Figure 8:
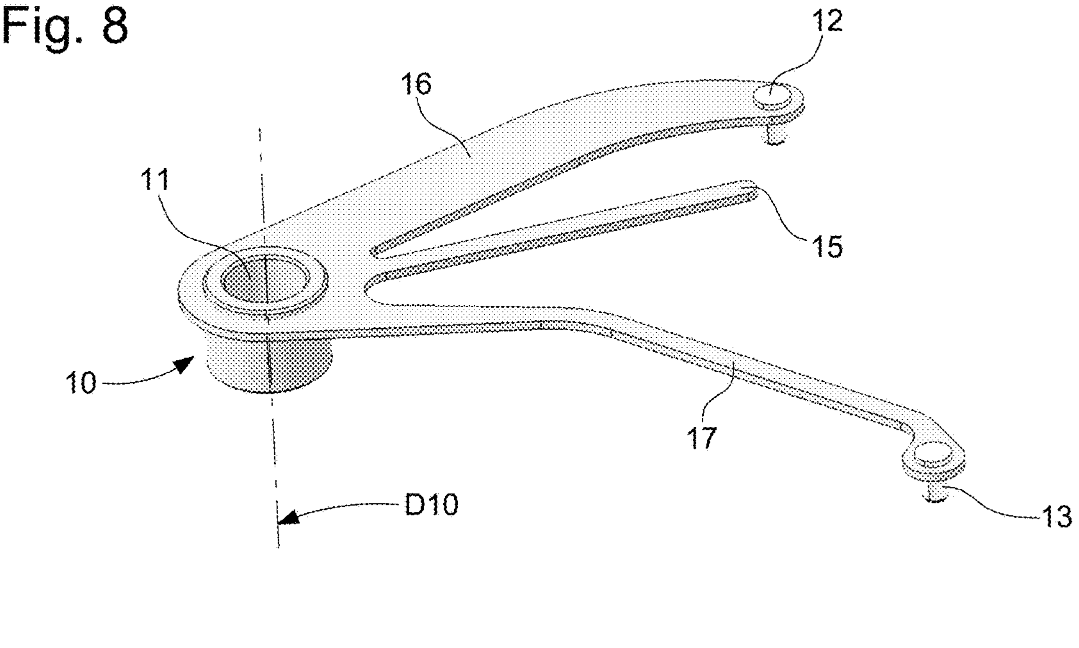
FIG. 8 represents a schematic, perspective top view of the stopping lever in FIG. 7.
Figure 9:
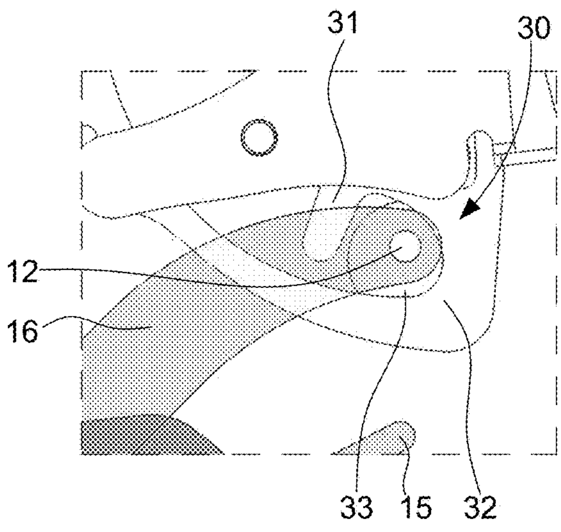
FIGS. 9 and 10 represent a schematic, partial bottom and transparent view of the components, the details of the cooperation between the pull-out piece and the control finger of the alternative embodiment in FIG. 7, in two positions of the control rod corresponding to the same idle position of the stopping lever.
Figure 10:
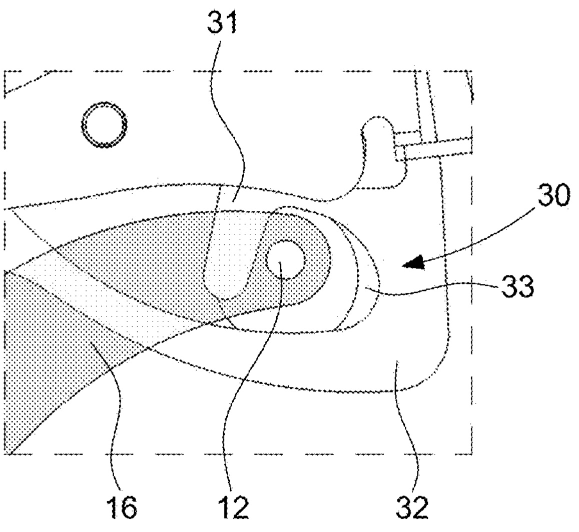
Figure 11:
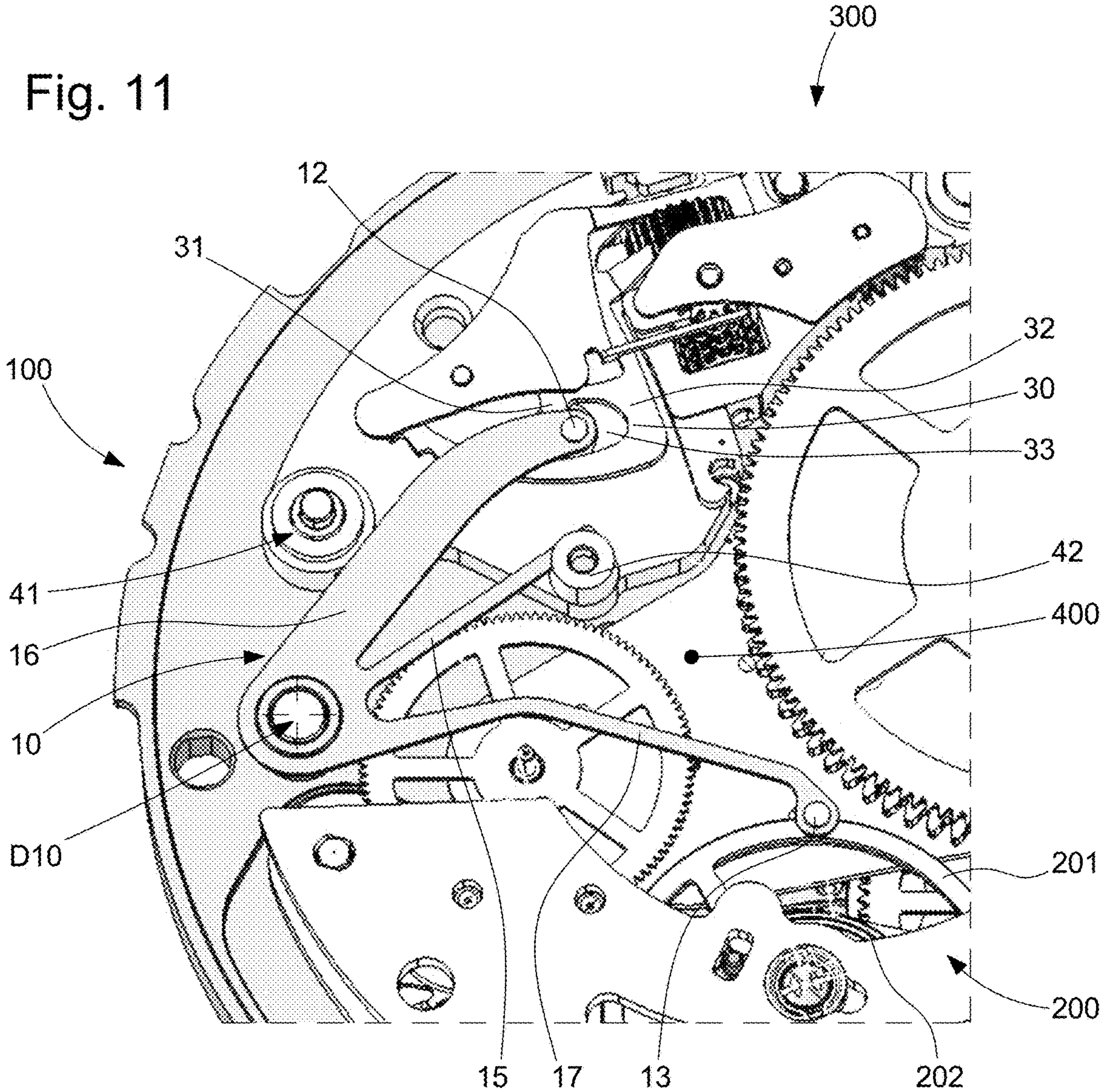
FIG. 11 illustrates, in the same as in FIG. 7, the same mechanism, but this time in an active position of the stopping lever where the stopping finger thereof is bearing on the wheel to be stopped.
Figure 12:
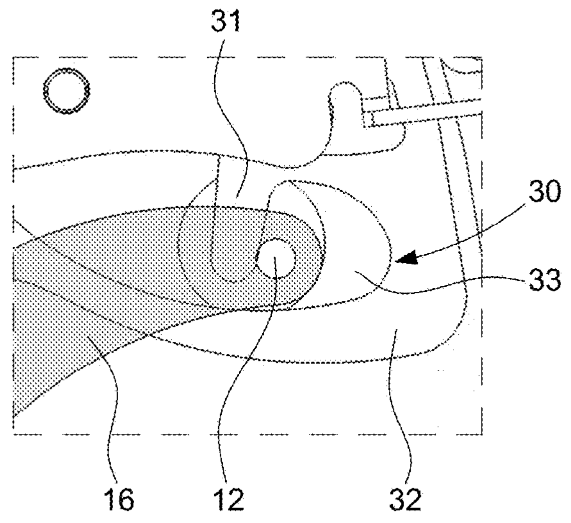
FIG. 12 illustrates, in the same way as FIGS. 9 and 10, the same mechanism in the position in FIG. 11, the control finger and the first support surface are then in contact for driving the stopping lever.
Figure 13:
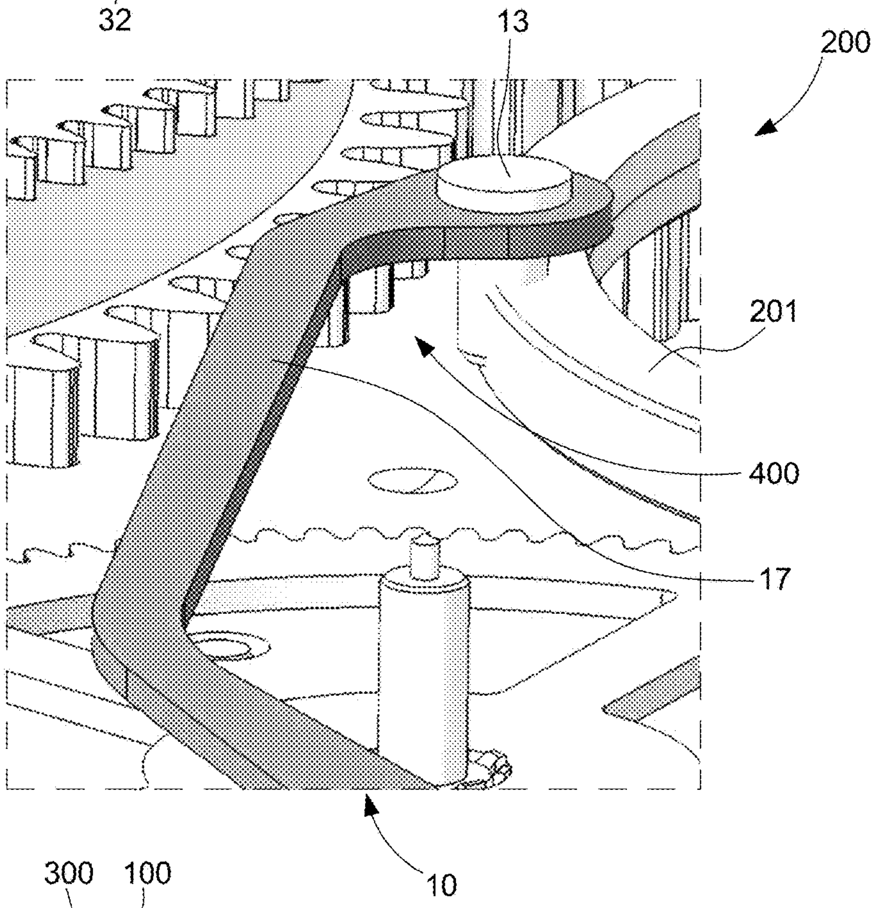
FIG. 13 represents a schematic, perspective top view of the details of the cooperation between the stopping finger and the wheel to be stopped.
Figure 14:
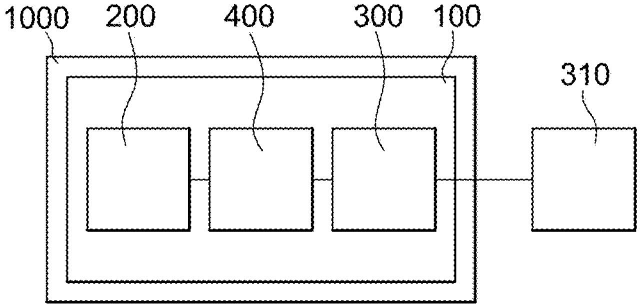
FIG. 14 is a block diagram representing a timepiece, here a watch, including a mechanism according to the invention.

The invention relates to a horological mechanism 100 which includes, fastened to a structure 400, control means 300.

These control means 300 are arranged to be set by a user, for example by means of a control rod, a button, a trigger-piece, or other, or by a mechanism of a timepiece 1000, for example a power reserve control mechanism, or other, or by a circuit of a timepiece 1000, particularly electromechanical. These control means 300 are arranged to control the stopping or release of a wheel 200, included in the mechanism 100. The figures illustrate, non-restrictively, the case of a wheel 200 of a regulating organ, such as a balance 201; many other applications are possible, particularly in a chronograph mechanism, or a striking mechanism, or other.

The mechanism 100 includes at least one stopping lever 10, which is guided on the structure 400 at a guidance, in particular in a non-restrictive embodiment illustrated by the figures, pivoted along a stopping axis D10 on the structure 400, particularly at a centring 11. This stopping lever 10 includes a first arm 16 which carries, particularly at a distance from said guidance, particularly from the stopping axis D10 in the alternative embodiment illustrated, a control finger 12, which is arranged to be set by the control means 300. The stopping lever 10 further includes a second arm 17 which carries, at a distance from the stopping axis D10, a stopping surface 13, particularly a stopping finger, which is arranged to bear on the wheel 200 and stop it, or to release it.

According to the invention, the stopping lever 10 furthermore includes a flexible arm 15, which is more flexible than the first arm 16, and which is arranged to bear against a first fixed banking 42 included in the structure 400, and which allows the pivoting of the stopping lever 10 about the stopping axis D10, in a single configuration for driving the control finger 12 by the control means 300 pushing the control finger 12, to move, and particularly pivot in the alternative embodiment illustrated, the second arm 17 and stop the movement of the wheel 200.

More specifically, the travel of the stopping lever 10, particularly the angular pivoting travel of the stopping lever 10 in the embodiment illustrated by the figures, is limited, on one hand by the first fixed banking 42, and on the other by the second fixed banking 41 carried by the structure 400.

More specifically, the second arm 17 is also a flexible arm which is more flexible than the first arm 16.

More specifically, the flexible arm 15 is more flexible than the second arm 17.

In a specific and non-restrictive application illustrated by the figures, the control means 300 include a pull-out piece 30, wherein an opening 33 is arranged to receive the control finger 12 between a first support surface 31 and a second surface 32, which is not functional in normal operation, and which can form a final travel-limiting surface for example in the case of a shock. And only a movement of the pull-out piece 30 generating driving of the control finger 12 by pushing the first support surface 31 can control the switch from an idle position of the stopping lever 10, wherein the stopping finger 13 is at a distance from the wheel 200, to an active position wherein the stopping finger 13 stops the movement of the wheel 200. The opposite movement, by separation between the control finger 12 and the first support surface 31, drives the return to the idle position of the stopping lever 10.

More specifically, in the idle positions, the stopping lever 10 bears both on the first fixed banking 42 and on the second fixed banking 41.

More specifically, in this specific pull-out piece embodiment, the control means 300 include a rod 310, which controls the pull-out piece 30, which in turn controls a sliding pinion. According to the execution of the control means, the rod can also conventionally control the pull-out piece, which controls the lever, which in turn controls the sliding pinion.

Even more specifically, this rod 310 is axially mobile, and is arranged to occupy three axial setting positions, two of which correspond to the idle position of the stopping lever 10 due to the lack of driving contact between the pull-out piece 30 and the control finger 12, and the third of which corresponds to the active position of the stopping lever by contact and driving cooperation between the pull-out piece 30 and the control finger 12.

More specifically, the wheel 200 is a balance of a setting organ which pivots about an axis D200, and which includes a balance-spring 202 and a felloe 201, with which the stopping finger 13 is arranged to cooperate.

In another alternative embodiment, the wheel 200 includes a periphery with a relief such as flutes, notching, cutting, or other, with which the stopping finger 13 can cooperate for stopping the wheel 200 in an indexed position.

The invention further relates to a timepiece 1000 which includes at least one such horological mechanism 100. More specifically, this timepiece 1000 is a watch.

In the specific application illustrated by the figures, relating to a horological movement with setting by acting upon an axially mobile rod in three positions, the invention makes it possible to use the stopping lever, also routinely known as a stop lever, in only two positions, whereas it would be necessary to manage three positions in the conventional construction with a stop lever conventionally set by the sliding pinion.

The invention also makes it possible to retain a reduced size, especially if the wheel to be stopped, particularly a balance, is very distant from the control organ, particularly a rod.

In sum, the stopping lever bearing on a first fixed banking is guided in the movement, and it is pressed against this support using the flexible arm 15 thereof. In the two axial rod positions where there is no contact between the control finger 12 between the first support surface 31, the stopping lever 10 does not move. It is only in the third position that the pull-out piece 30 pushes the stopping lever 10, when pushing the control finger 12 by the first support surface 31, the stopping lever 10 then locks the wheel 200.

The invention claimed is:

1. A horological mechanism (100) including, fastened to a structure (400), control means (300) arranged to be set by a user or by a mechanism or by a circuit of a timepiece (1000) and to control the stopping or release of a wheel (200), included in said mechanism (100), which includes at least one stopping lever (10) guided on said structure (400) at a guidance, said stopping lever (10) including a first arm (16) carrying, at a distance from said guidance, a control finger (12) arranged to be set by said control means (300), and a second arm (17) carrying, at a distance from said guidance, a stopping surface (13) arranged to bear against said wheel (200) or to release it, wherein said stopping lever (10) further includes a flexible arm (15), which is more flexible than said first arm (16) and which is arranged to bear against a first fixed banking (42) included in said structure (400), and which allows the movement of said stopping lever (10) in relation to said guidance, in a single configuration for driving said control finger (12) by said control means (300) pushing said control finger (12), to move said second arm (17) and stop the movement of said wheel (200) and wherein the arm, the second arm and the flexible arm extend on one same side of said guidance.

2. The horological mechanism (100) according to claim 1, wherein the travel of said stopping lever (10) is limited, on one hand by said first fixed banking (42), and on the other by a second fixed banking (41) carried by said structure (400).

3. The horological mechanism (100) according to claim 2, wherein, in an idle position, said stopping lever (10) bears both on said first fixed banking (42) and on said second fixed banking (41).

4. The horological mechanism (100) according to claim 1, wherein said second arm (17) is also a flexible arm, which is more flexible than said first arm (16).

5. The horological mechanism (100) according to claim 4, wherein said flexible arm (15) is more flexible than said second arm (17).

6. The horological mechanism (100) according to claim 1, wherein said stopping lever (10) is pivotable about a stopping axis (D10) defining said guidance.

7. The horological mechanism (100) according to claim 1, wherein said control means (300) include a pull-out piece (30) wherein an opening (33) is arranged to receive said control finger (12) between a first support surface (31) and a second travel-limiting surface (32), and wherein only a movement of said pull-out piece (30) generating driving of said control finger (12) by pushing said first support surface (31) controls a switch from an idle position of said stopping lever (10), wherein said stopping surface (13) is at a distance from said wheel (200), to an active position wherein said stopping surface (13) stops the movement of said wheel (200).

8. The horological mechanism (100) according to claim 7, wherein said control means (300) include a rod (310) arranged to drive said pull-out piece (30), which in turn controls a sliding pinion.

9. The horological mechanism (100) according to claim 8, wherein said rod (310) is axially mobile and arranged to occupy three axial setting positions, two of which correspond to said idle position of said stopping lever (10) due to the lack of driving contact between said pull-out piece (30) and said control finger (12), and the third of which corresponds to said active position of said stopping lever by contact and driving cooperation between said pull-out piece (30) and said control finger (12).

10. The horological mechanism (100) according to claim 1, wherein said wheel (200) is a felloe (201) of a setting organ, with which the stopping surface (13) is arranged to cooperate.

11. A timepiece (1000) including at least one horological mechanism (100) according to claim 1.

12. The timepiece (1000) according to claim 11, wherein said timepiece (1000) is a watch.

13. The horological mechanism (100) according to claim 1, wherein the flexible arm (15) is between the first arm (16) and the second arm (17).

14. The horological mechanism (100) according to claim 1, wherein every portion of the second arm (17) is further away from the first arm (16) than is any portion of the flexible arm (15) from the first arm (16).

15. The horological mechanism (100) according to claim 1, wherein the first fixed banking (42) is between the second arm (17) and ends of both of the flexible arm (16) and the first arm (16).

16. The horological mechanism (100) according to claim 1, wherein first longitudinal ends of each of the flexible arm (15), first arm (16), and second arm (17) are all physically joined to each other at a same end of the stopping lever (10).

17. The horological mechanism (100) according to claim 16, wherein, other than at the first longitudinal ends, all other portions the flexible arm (15), all other portions of the first arm (16), and all other portions of the second arm (17) are all physically separated from each other.

18. The horological mechanism (100) according to claim 16, wherein, other than at the first longitudinal ends, all other portions the flexible arm (15), the first arm (16), and the second arm (17) are all cantilevered away from the first longitudinal ends at the same end of the stopping lever (10).

* * * * *